United States Patent
Sagardoyburu et al.

(10) Patent No.: US 11,809,038 B2
(45) Date of Patent: Nov. 7, 2023

(54) METHOD FOR MANUFACTURING A LIQUID CRYSTAL DISPLAY DEVICE AND LIQUID CRYSTAL DISPLAY DEVICE

(71) Applicant: The Swatch Group Research and Development Ltd, Marin (CH)

(72) Inventors: Michel Sagardoyburu, Neuchâtel (CH); Simon Springer, Berne (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/487,458

(22) Filed: Sep. 28, 2021

(65) Prior Publication Data
US 2022/0197085 A1   Jun. 23, 2022

(30) Foreign Application Priority Data
Dec. 21, 2020   (EP) .................................... 20216148

(51) Int. Cl.
*G02F 1/1335*   (2006.01)
*G02F 1/13357*   (2006.01)
(Continued)

(52) U.S. Cl.
CPC ...... *G02F 1/133555* (2013.01); *G02F 1/1343* (2013.01); *G02F 1/133374* (2021.01);
(Continued)

(58) Field of Classification Search
CPC ......... G02F 1/133553; G02F 1/133555; G02F 1/133536; G02F 1/133374
See application file for complete search history.

(56) References Cited

U.S. PATENT DOCUMENTS 5,926,293 A   7/1999 Ralli
6,147,934 A * 11/2000 Arikawa ............... G02B 27/283
                                                    368/242
(Continued)

FOREIGN PATENT DOCUMENTS

JP   10-268801 A   10/1998
JP   H11-167351 A   6/1999
(Continued)

OTHER PUBLICATIONS

European Search Report dated Jun. 3, 2021 in European Application 20216148.5, filed on Dec. 21, 2020, 3 pages (with English Translation of Categories).
(Continued)

*Primary Examiner* — Paisley L Wilson
(74) *Attorney, Agent, or Firm* — Oblon, McClelland, Maier & Neustadt, L.L.P.

(57) ABSTRACT

A method for manufacturing a reflective or transflective liquid crystal display device including a liquid crystal cell whose liquid crystal molecules are aligned in a planar or vertical manner, this liquid crystal cell being formed of a transparent front substrate located on the side of an observer, and a rear substrate, also transparent, which extends under the front substrate, parallel to and at a distance from the latter, these two front and rear substrates being joined together with a sealing frame which delimits a sealed enclosure in which a liquid crystal composition is confined, the front and rear substrates being coated on the opposite faces thereof with electrically conductive transparent electrodes and counter-electrodes, the optical properties of the liquid crystal composition being changed by applying an electric field at the crossing point between an electrode and a corresponding counter-electrode.

20 Claims, 3 Drawing Sheets

(51) Int. Cl.
*G02F 1/1343* (2006.01)
*G04G 9/12* (2006.01)
*G02F 1/1333* (2006.01)

(52) U.S. Cl.
CPC .. *G02F 1/133536* (2013.01); *G02F 1/133608* (2013.01); *G04G 9/12* (2013.01)

(56) References Cited

U.S. PATENT DOCUMENTS

| | | | |
|---|---|---|---|
| 7,227,599 B2 * | 6/2007 | Sonoda | G02F 1/134309 349/114 |
| 7,806,539 B2 * | 10/2010 | Parker | G02B 6/0021 362/625 |
| 2003/0165085 A1 | 9/2003 | Brewer et al. | |
| 2003/0165086 A1 | 9/2003 | Brewer et al. | |
| 2003/0198141 A1 | 10/2003 | Brewer et al. | |
| 2007/0153162 A1 | 7/2007 | Wright et al. | |

FOREIGN PATENT DOCUMENTS

| | | | |
|---|---|---|---|
| JP | 2002-202506 A | 7/2002 | |
| JP | 2003-75646 A | 3/2003 | |

OTHER PUBLICATIONS

Notice of the Reason for Refusal dated Nov. 8, 2022, in corresponding Japanese Patent Application No. 2021-179959, 6 pages.
Office Action dated May 30, 2023, in corresponding Japanese Patent Application No. 2021-179959 (with English Translation), 12 pages.

\* cited by examiner

METHOD FOR MANUFACTURING A LIQUID CRYSTAL DISPLAY DEVICE AND LIQUID CRYSTAL DISPLAY DEVICE

CROSS-REFERENCE TO RELATED APPLICATION

This application claims priority to European Patent Application No. 20216148.5 filed on Dec. 21, 2020, the entire disclosure of which is hereby incorporated herein by reference.

TECHNICAL FIELD OF THE INVENTION

The present invention relates to a method for manufacturing a liquid crystal display device as well as a liquid crystal display device obtained in particular thanks to this method. The present invention relates in particular to a manufacturing method allowing providing a liquid crystal display device with a decorative and/or functional pattern perceptible through a transparent display surface of this liquid crystal display device.

TECHNOLOGICAL BACKGROUND OF THE INVENTION

The present invention relates to digital type display devices, that is to say display devices which are capable of displaying information in alphanumeric form, as opposed to analogue display devices which display information by means of one or more hand(s) which are displaced opposite to graduations.

A well-known family of digital display devices groups the liquid crystal display devices. These liquid crystal display devices conventionally comprise a liquid crystal cell formed of a transparent front substrate located on the side of an observer, and a rear substrate, transparent or not, which extends parallel to and at a distance from the front substrate. These two front and rear substrates are usually joined together by means of a sealing frame which delimits a sealed enclosure in which a liquid crystal composition is confined. Finally, the front and rear substrates are coated on the opposite faces thereof with electrically conductive transparent electrodes and counter-electrodes; by applying an electric field between an electrode and a corresponding counter-electrode, the optical properties of the liquid crystal composition are changed at the crossing point of the electrode and the corresponding counter-electrode.

Within the scope of the present invention, interest is in particular shown to the liquid crystal cells of:
- the Twist Nematic or TN type;
- the Super Twist Nematic or STN type;
- the Guest Host type;
- the Vertically Aligned or VA type or else the Electrically Controlled Birefringence or ECB type.

In order to be able to operate in reflective mode, the TN, STN, Guest Host, Vertically Aligned or else Electrically Controlled Birefringence type liquid crystal cells must be provided with a reflective polariser which, most often, is laminated against a lower face of the rear substrate and whose function is to reflect the light which enters the liquid crystal cell through the front face of the latter and passes through this liquid crystal cell over its entire thickness, until being reflected thereon.

There are several types of reflective polarisers which, depending on the case, provide specular or diffuse reflection. A first type of reflective polariser consists of an absorbent/transparent type polariser. Such a type of polariser absorbs a first component of the light and transmits the other component of the light polarised in a direction orthogonal to that of the first component. In order to form the reflective polariser, the lower face of the absorbent/transparent polariser is provided with a reflector, for example a thin metallic layer of aluminium or silver, on which the light transmitted by the absorbent/transparent polariser is reflected and is returned to the top of the liquid crystal cell, towards the observer.

In the case of a transflective type liquid crystal display device, that is to say which is both reflective and transparent, the polariser should be both reflective and transparent. In order to be able to obtain such a polariser which is both partially reflective and transparent, one solution consists in reducing the thickness of the metallic layer which is provided in the absorbent polariser to a very low value, in the range of a few nanometres, which is accurately controlled. Such a transflective liquid crystal display device is then equipped with a backlight device disposed under the rear substrate and which emits light through the partially reflective/transparent polariser to the top of the liquid crystal cell.

Another solution to allow a TN, STN, Guest Host, Vertically Aligned or Electrically Controlled Birefringence type liquid crystal cell to operate in reflective mode consists in equipping such a liquid crystal cell with a reflective/transparent polariser which reflects a direction of polarisation of the light and which is transparent to the direction of polarisation of the orthogonal light. Such a reflective/transparent polariser may be of the "Coextruded Multilayer Birefringent Interference Polariser" type such as that marketed by the company 3M under the brand Dual Brightness Enhancement Film or else of the Wire-grid Polariser type. The reflective/transparent polariser is fastened, for example by lamination, on the lower face of the rear substrate, and a black or coloured background is added in turn to absorb the light which must not be reflected. In the case where it is desired to obtain a transflective liquid crystal cell, the black or coloured background will only be partially absorbent to pass the light produced by a backlight device disposed under the rear substrate.

There are also display devices comprising a liquid crystal cell provided with a single polariser on an upper face of the front substrate thereof, while a metallic reflector is disposed between the front substrate and the rear substrate thereof.

The liquid crystal display devices of the prior art which comprise a TN, STN, Guest Host, Vertically Aligned or else Electrically Controlled Birefringence type display cell thus display information in the form of alphanumeric characters or icons which are detached against a homogeneous flat background, of specular or diffusing type. There is therefore little possible variations in appearance between these liquid crystal display devices of the prior art, such that it is difficult for the manufacturers to be distinguished from each other. Likewise, the objects such as wristwatches in particular which are equipped with such liquid crystal display devices have very similar appearances.

SUMMARY OF THE INVENTION

The present invention aims at overcoming the above-mentioned problems as well as others still by providing a manufacturing method allowing making liquid crystal display devices of the reflective or transflective type, whose appearances can be infinitely varied. The present invention also aims at providing liquid crystal display devices of the reflective or transflective type which have an original aesthetic appearance.

To this end, the present invention relates to a method for manufacturing a reflective or transflective liquid crystal display device comprising a liquid crystal cell whose liquid crystal molecules are aligned in a planar or vertical manner, this liquid crystal cell being formed of a transparent front substrate located on the side of an observer, and a rear substrate, also transparent, which extends under the front substrate, parallel to and at a distance from the latter, these two front and rear substrates being joined together by means of a sealing frame which delimits a sealed enclosure in which a liquid crystal composition is confined, the front and rear substrates being coated on the opposite faces thereof with electrically conductive transparent electrodes and counter-electrodes, the optical properties of the liquid crystal composition being changed by applying an electric field at the crossing point between an electrode and a corresponding counter-electrode, the liquid crystal display device being provided with a reflective polarising film arranged to absorb a first component of a light which enters the liquid crystal cell through the front substrate, and to reflect a second component of the light polarised in a direction orthogonal to that of the first component, this reflective polarising film comprising an absorbent polariser combined with an at least partially reflecting reflector disposed under the absorbent polariser, the method comprising the step which consists in bringing the reflector into relief to impart a decorative and/or functional shape thereto visible to the observer through the front substrate of the liquid crystal cell, then in fastening this reflector under the absorbent polariser which is itself fastened against a lower face of the rear substrate.

According to particular embodiments of the invention:
- the at least partially reflective reflector is obtained by bringing into relief a layer of transparent material comprising a rear face to which the desired decorative and/or functional relief shape is imparted and on which an at least partially reflective layer is deposited, the layer of transparent material also comprising a front face opposite to the rear face and on which an absorbent polariser is fastened, the reflective polarising film formed of the at least partially reflective layer and of the absorbent polariser being fastened via this absorbent polariser against the lower face of the rear substrate by means of an optically transparent adhesive layer;
- the at least partially reflective layer is metallic;
- the metal is selected from the group formed by silver, aluminium, nickel, chromium, titanium, platinum, palladium, gold as well as the alloys of these metals;
- the at least partially reflective layer is obtained by physical vapour deposition, evaporation or sputtering;
- the at least partially reflective layer is formed of a plurality of layers of dielectric materials having refractive indices different from each other and forming a dielectric mirror;
- the layer of transparent material is made of resin;
- the layer of transparent material is formed by resin injection or by thermoforming a resin sheet;
- the at least partially reflecting reflector is obtained by bringing into relief a metallic film or a plastic film coated on a rear face with an at least partially reflective layer, a front face of the metallic film or of the coated plastic film being covered with a layer of transparent material on which an absorbent polariser is fastened, the reflective polarising film formed of the reflector and the absorbent polariser being fastened via this absorbent polariser against the lower face of the rear substrate by means of an optically transparent adhesive layer.

The present invention also relates to a reflective or transflective liquid crystal display device comprising a liquid crystal cell whose liquid crystal molecules are aligned in a planar or vertical manner, this liquid crystal cell being formed of a transparent front substrate located on the side of an observer, and a rear substrate, also transparent, which extends under the front substrate, parallel to and at a distance from the latter, these two front and rear substrates being joined together by means of a sealing frame which delimits a sealed enclosure in which a liquid crystal composition is confined, the front and rear substrates being coated on the opposite faces thereof with electrically conductive transparent electrodes and counter-electrodes, the optical properties of the liquid crystal composition being changed by applying an electric field at the crossing point between an electrode and a corresponding counter-electrode, the liquid crystal display device being provided with a reflective polarising film to absorb a first component of a light which enters the liquid crystal cell through the front substrate, and to reflect a second component of the light polarised in a direction orthogonal to that of the first component, the reflective polarising film comprising an absorbent polariser combined with an at least partially reflecting reflector disposed under the absorbent polariser, the reflector having a decorative and/or functional relief shape visible to an observer through the front substrate of the liquid crystal cell, the reflective polarising film being fastened against a lower face of the rear substrate of the liquid crystal cell via the absorbent polariser by means of an optically transparent adhesive layer According to particular embodiments:
- the at least partially reflecting layer comprises a layer of transparent material which has the desired decorative and/or functional relief shape and of which a rear face is covered with an at least partially reflective layer, the layer of transparent material also comprising a front face opposite to the rear face covered with a layer of transparent material on which the absorbent polariser is fastened;
- the at least partially reflective layer is metallic;
- the metal from which the at least partially reflective layer is made is selected from the group formed by silver, aluminium, nickel, chromium, titanium, platinum, palladium, gold as well as the alloys of these metals;
- the at least partially reflective layer is formed of a plurality of layers of dielectric materials having refractive indices different from each other and forming a dielectric mirror;
- the layer of transparent material is made of resin;
- the at least partially reflective reflector is formed of a metallic film or a plastic film coated on a rear face with an at least partially reflective layer, a front face of the metallic film or the coated plastic film being covered with a layer of transparent material on which the absorbent polariser is fastened.

The invention also relates to a timepiece comprising a display device of the above-mentioned kind.

Thanks to these features, the present invention provides a method for manufacturing reflective or transflective liquid crystal display devices which display alphabetic, digital or other information on backgrounds in relief which have innovative and very different aspects from each other. This result is achieved by teaching to print on the reflector relief shapes which will be perceptible to the naked eye by the wearer of the watch when looking at the useful display surface of the liquid crystal cell. In particular, in the case where a liquid crystal display device according to the invention is embedded in a wristwatch, the reflector can be brought into relief to give it a texture imitating the appearance of conventional watch dials: Clous de Paris, Cotes de Geneve, weaving effect, sun brushed, engine-turnings etc. Simple variations in height can also be imprinted on the reflector to highlight areas with or without texture, or else areas of the useful display surface of the liquid crystal cell where display segments are located. Finally, thanks to the invention, it is also possible to print, in the reflector, figurative patterns such as plant patterns, or else patterns inspired by cameos, the faces of coins, sculptures or else bas-reliefs. The present invention thus allows manufacturers of watches or other electronic products comprising a reflective or transflective liquid crystal display device to offer their customers objects whose aesthetic is original and stands out from the competition while using a liquid crystal-based technology which is conventional and well mastered and therefore reliable and inexpensive. The possibility offered by the present invention to easily change the rear decoration of a liquid crystal display device allows the manufacturers to have a wide range of products having different aesthetic appearances, but which are based on a common technological platform, which allows sharing the manufacturing costs. For example, the shape of the segments and icons of a liquid crystal cell according to the invention could be common to several display devices which nevertheless have different decorative and/or technical elements.

BRIEF DESCRIPTION OF THE FIGURES

Other features and advantages of the present invention will emerge more clearly from the following detailed description of an embodiment of the method according to the invention, this example being given for purely illustrative and not limiting purposes only in connection with the appended drawing on which.

DETAILED DESCRIPTION OF THE INVENTION

Figure 1:
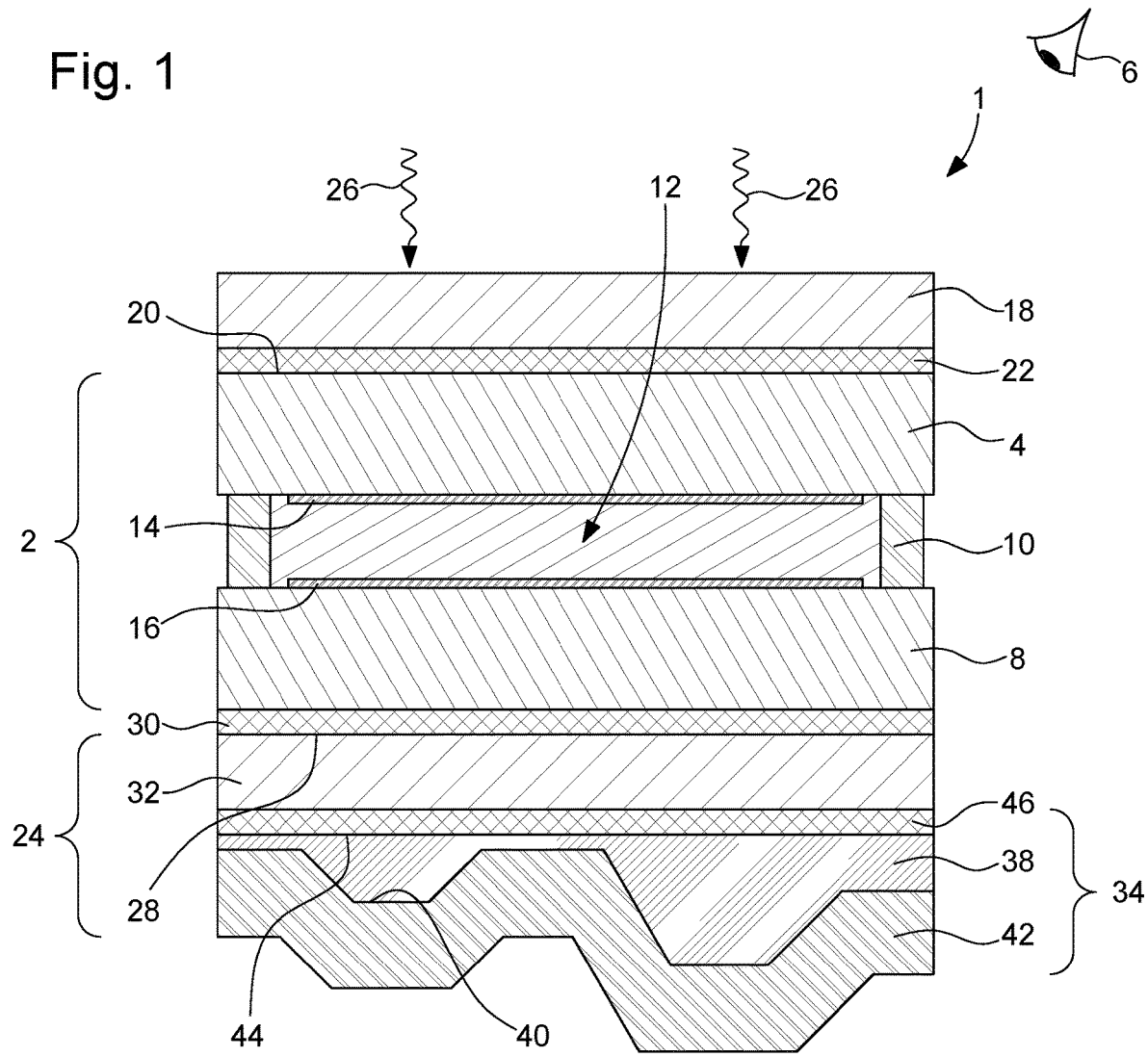
FIG. 1 schematically illustrates in section a liquid crystal display device comprising a liquid crystal cell and a reflective polarising film formed of a reflector brought into relief and an absorbent polariser via which the reflective polarising film is fastened by means of an optically transparent adhesive layer against a lower face of a rear substrate of the liquid crystal cell.

FIG. 1 is a sectional view of a liquid crystal display device designated as a whole by the general reference numeral 1. This liquid crystal display device 1 comprises a liquid crystal cell 2 which includes a transparent front substrate 4 located on the side of an observer 6, and a rear substrate 8, also transparent, which extends under the front substrate 4, parallel to and at a distance from the latter. The two front 4 and rear 8 substrates are joined together by means of a sealing frame 10 which delimits a sealed enclosure 12 in which a liquid crystal composition is confined. The front 4 and rear 8 substrates are coated on the opposite faces thereof with electrically conductive transparent electrodes 14 and counter-electrodes 16. The optical properties of the liquid crystal composition are changed by applying an electric field at the crossing point between an electrode 14 and a corresponding counter-electrode 16. The liquid crystal cell 2 is also provided with an absorbent polariser 18 bonded to the upper face 20 of the front substrate 4 by means of an optically transparent adhesive layer 22, also known as Optical Clear Adhesive or OCA.

Finally, the liquid crystal cell 2 is provided with a reflective polarising film 24 arranged to absorb a first component of a light 26 which enters the liquid crystal cell 2 through the front substrate 4, and to reflect a second component of the light polarised in a direction orthogonal to that of the first component. This reflective polarising film 24 is fastened against a lower face 28 of the rear substrate 8 by means of an optically transparent adhesive layer 30 of the OCA type.

Figure 2:
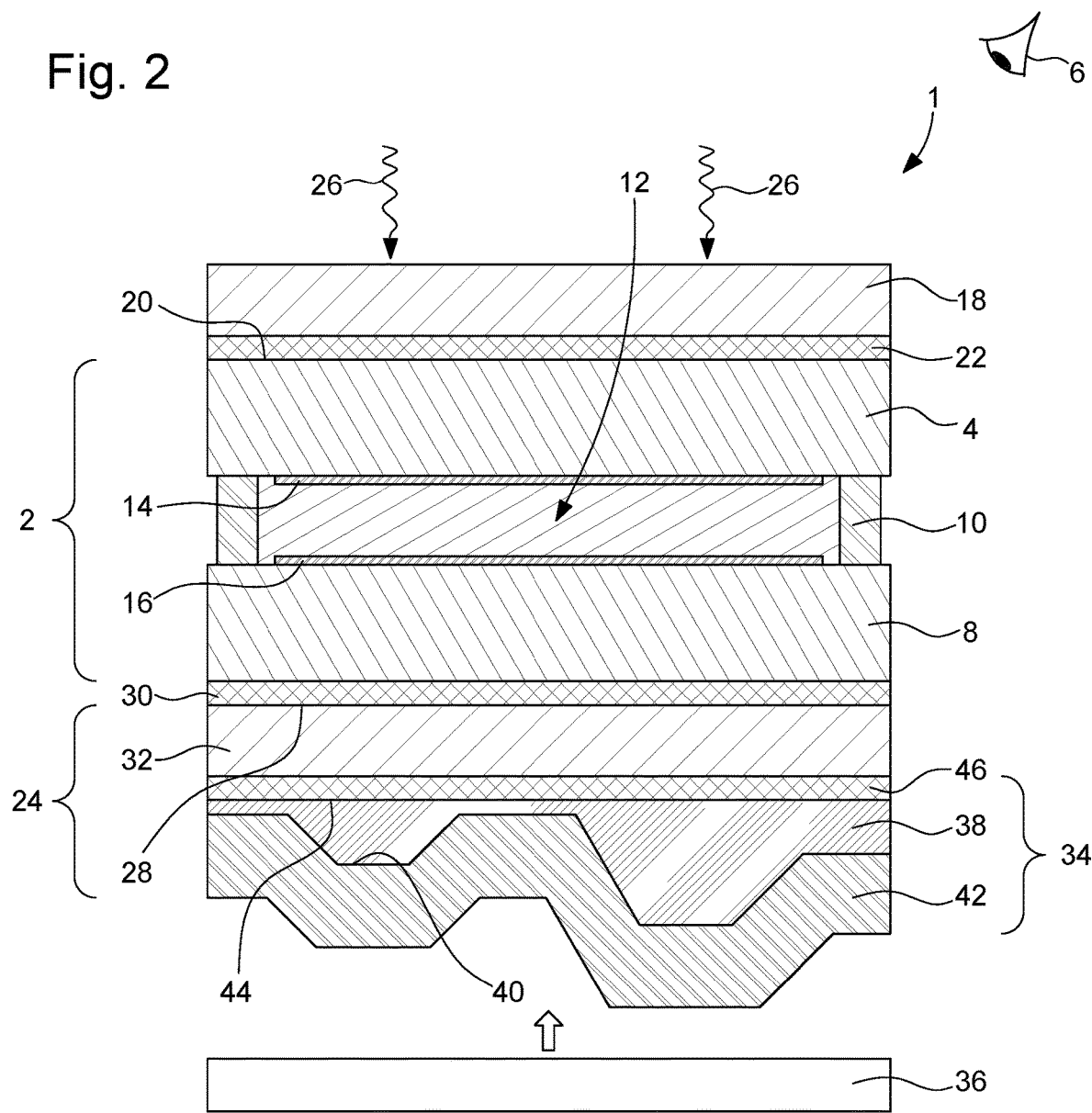
FIG. 2 is a view similar to that of FIG. 1, a backlight device being disposed under the liquid crystal display device.

The reflective polarising film 24 comprises an absorbent polariser 32 combined with an at least partially reflective reflector 34. Depending on whether this reflector 34 is partially or totally reflective, the display device 1 is transflective, respectively reflective. In the case where the display device 1 is transflective, a backlight device 36 is disposed under the reflective polarising film 24 (see FIG. 2).

The method according to the invention comprises the step which consists in bringing the reflector 34 into relief to impart a decorative and/or functional shape thereto visible to the observer 6 through the front substrate 4 of the liquid crystal cell 2, then in fastening this reflector 34 under the absorbent polariser 32 which is itself fastened against a lower face 28 of the rear substrate 8 by means of the optically transparent adhesive layer 30.

The at least partially reflective reflector 34 is obtained by shaping a layer of transparent material 38 to which the desired decorative and/or functional relief shape is imparted. This layer of transparent material 38 comprises a rear face 40 which has the desired relief shapes and on which an at least partially reflective layer 42 is deposited, as well as a planar front face 44 opposite to the rear face 40. The absorbent polariser 32 is fastened on the planar front face 44 of the layer of transparent material 38 by means of an adhesive layer 46 formed of an optically transparent adhesive of the Optical Clear Adhesive or OCA type. This adhesive layer 46 may be in the form of a pressure-sensitive film which is laminated on the layer of transparent material 38 or is dispensed as a layer of liquid glue on this layer of transparent material 38. Finally, the absorbent polariser 32 is covered with the adhesive layer 30 formed of an optically transparent adhesive of the Optical Clear Adhesive or OCA type. After securing the absorbent polariser 32 on the layer of transparent material 38 via the adhesive layer 46, the reflective polarising film 24 is obtained which is in turn secured against the lower face 28 of the rear substrate 8 of the liquid crystal cell 2 by means of the optically transparent adhesive layer 30.

The at least partially reflective layer 42 which is deposited on the rear face 40 of the layer of transparent material 38 to form the reflector 34 may be metallic. The metal is then advantageously selected from the group formed by silver, aluminium, nickel, chromium, titanium, platinum, palladium, gold and the alloys of these metals. This at least partially reflective layer 42 can be non-exclusively deposited by physical vapour deposition, by evaporation or by sputtering. This at least partially reflective layer 42 can also be formed of a plurality of layers of dielectric materials having refractive indices different from each other and forming a dielectric mirror.

Concerning the layer of transparent material 38 on the rear face 40 of which the at least partially reflective layer 42 is deposited, it can be made of resin, for example by injection of such a resin or by thermoforming of a resin sheet. The resin can thus be injected into a mould, one of the portions of which has the shapes in relief corresponding to the shapes which are sought to be given to the reflector 34. If the used resin is photosensitive, it can be solidified by exposure to an ultraviolet radiation when it is between the two portions of the mould. In the case where a resin sheet is used as the base material, bringing the latter into relief can be obtained by cold or hot deformation against a mould having the relief shapes which correspond to the shapes which are sought to be given to this resin sheet in order to obtain the desired reflector 34. If the resin in the sheet state is photosensitive, the shape thereof can be frozen by exposure to an ultraviolet radiation.

Once the layer of transparent material 38 is shaped and coated on the rear face 40 thereof with the at least partially reflective layer 42 to form the reflector 34, the absorbent polariser 32 is fastened on the front face 44 thereof. Before or after polymerisation of the layer of transparent material 38, the optically transparent adhesive layer 46 is deposited on this layer of transparent material 38 by means of which the absorbent polariser 32 is fastened on this layer of transparent material 38.

The at least partially reflective reflector 34 can also be obtained by bringing into relief an at least partially reflective metallic film or a plastic film coated on a rear face with an at least partially reflective layer, for example metallic layer. A front face of the metallic film or the coated plastic film is then covered with the layer of transparent material 38 on which the absorbent polariser 32 is fastened by means of the optically transparent adhesive layer 46. The reflective polarising film 24 formed of the reflector 34 and the absorbent polariser 32 is fastened via this absorbent polariser 32 against the lower face 28 of the rear substrate 8 of the liquid crystal cell 2 by means of the optically transparent adhesive layer 30.

Figure 3:
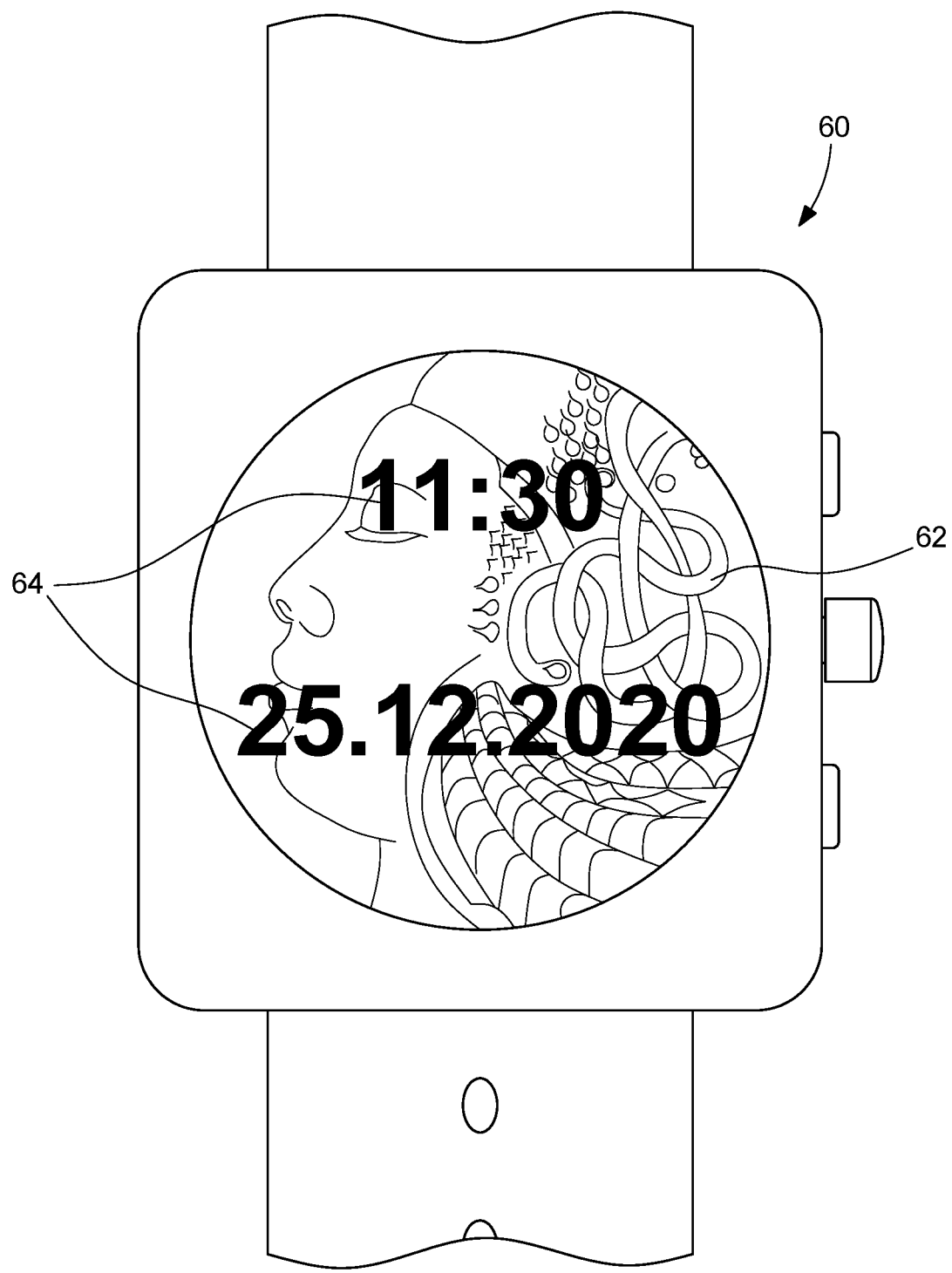
FIG. 3 is a view of a wristwatch equipped with a liquid crystal cell whose reflective polarising film, disposed under the liquid crystal display device, has been brought into relief to display a figurative image of a cameo through the useful display surface of the liquid crystal cell.

FIG. 3 is a view of a wristwatch 60 equipped with a liquid crystal cell whose reflective polarising film, disposed under the liquid crystal display device, has been brought into relief to display a figurative image 62 of a cameo through the useful display surface of the liquid crystal cell. It can thus be seen that the useful information 64 displayed by the liquid crystal display device is superimposed on the figurative image 62 formed in the reflective polarising film, permanently or on demand, which gives the wristwatch 60 a completely remarkable and innovative aesthetic appearance. Of course, the reflective polarising film can be shaped to display not a figurative image, but technical information such as for example a graduation which will cooperate with information displayed by the liquid crystal display device.

It goes without saying that the present invention is not limited to the embodiments of a reflective or transflective liquid crystal display device which have just been described and that various modifications and simple variants can be considered by the person skilled in the art without departing from the scope of the invention as defined by the appended claims. It will be recalled in particular that the term "reflective polariser" means a polariser which reflects a direction of polarisation of the light and which transmits the orthogonal direction of polarisation. Likewise, the term "absorbent polariser" means a polariser which absorbs one component of the light and which transmits the other component of the light which is orthogonal to the component of the absorbed light. It will also be noted that the present invention applies to liquid crystal cells whose liquid crystal molecules are aligned in a planar manner, that is to say with the major axis thereof which extends parallel to the substrates of the liquid crystal cell, or else whose liquid crystal molecules are aligned vertically, that is to say with the major axis thereof which extends perpendicularly to the substrates of the liquid crystal cell. Examples of such liquid crystal cells are given by the liquid crystal cells of the Twist Nematic, Super Twist Nematic, Guest Host type, or else the Vertically Aligned or VA or the Electrically Controlled Birefringence or ECB type. It should also be noted that the adhesive layers 30, 38 and 46 can be made by means of a slightly diffusing material, in order to provide a mat or satin appearance to the reflected light. The invention also relates to a timepiece, in particular a wristwatch, equipped with a liquid crystal display device 1 of the type described above. The wearer of the watch will thus see through the front substrate 4 of the liquid crystal cell 2, in the background of the information displayed by this liquid crystal cell 2, the decoration or any other functional indication printed in relief in the reflective polarising film 24, which allows giving this watch an appearance which is specific thereto and which is distinguished from the appearance of the watches from the competition.

NOMENCLATURE

1. Liquid crystal display device
2. Liquid crystal cell
4. Front substrate
6. Observer
8. Rear substrate
10. Sealing frame
12. Sealed enclosure
14. Electrodes
16. Counter electrodes
18. Absorbent polariser
20. Upper face
22. Adhesive layer
24. Reflective polarising film
26. Light
28. Inner face
30. Adhesive layer
32. Absorbent polariser
34. Reflector
36. Backlight device
38. Layer of transparent material
40. Rear face
42. Layer
44. Front face
46. Adhesive layer
60. Wristwatch
62. Figurative image
64. Useful information

The invention claimed is:

1. A method for manufacturing a reflective or transflective liquid crystal display device comprising a liquid crystal cell whose liquid crystal molecules are aligned in a planar or vertical manner, said liquid crystal cell being formed of a transparent front substrate located on a side of an observer, and a rear substrate, also transparent, which extends under the front substrate, parallel to and at a distance from the latter, the two front and rear substrates being joined together with a sealing frame which delimits a sealed enclosure, wherein a liquid crystal composition is confined, the front and rear substrates are coated on opposite faces thereof with electrically conductive transparent electrodes and counter-electrodes, optical properties of the liquid crystal composition are changed by applying an electric field at a crossing point between an electrode and a corresponding counter-electrode, the liquid crystal display device is provided with a reflective polarising film arranged to absorb a first component of a light which has entered the liquid crystal cell through the front substrate and to reflect a second component of the light polarised in a direction orthogonal to that of the first component, and said reflective polarising film comprises an absorbent polariser combined with an at least partially reflective reflector disposed under the absorbent polariser, the method comprising:

bringing the reflector into relief including concave and convex shapes to impart a decorative and/or functional shape thereto visible to the observer through the front substrate of the liquid crystal cell, after bringing the reflector into relief, fastening said reflector under the absorbent polariser which is itself fastened against a lower face of the rear substrate, and providing the light from the front substrate through the liquid crystal cell and the reflective polarising film.

2. The manufacturing method according to claim 1, wherein the reflective polarising film which is at least partially reflective is obtained by bringing into relief a layer of transparent material to which a desired decorative and/or functional relief shape is imparted and on a rear face of which an at least partially reflective layer is deposited, the layer of transparent material also comprising a front face opposite to the rear face and on which the absorbent polariser is fastened, the reflective polarising film formed of the at least partially reflective layer, of the layer of transparent material and of the absorbent polariser being fastened via said absorbent polariser against the lower face of the rear substrate with an optically transparent adhesive layer.

3. The manufacturing method according to claim 2, wherein the at least partially reflective layer is metallic.

4. The manufacturing method according to claim 3, wherein the metal is selected from a group formed by silver, aluminum, nickel, chromium, titanium, platinum, palladium, gold as well as alloys of these metals.

5. The manufacturing method according to claim 4, wherein the at least partially reflective layer is obtained by physical vapour deposition, evaporation or sputtering.

6. The manufacturing method according to claim 3, wherein the at least partially reflective layer is obtained by physical vapour deposition, evaporation or sputtering.

7. The manufacturing method according to claim 2, wherein the layer of transparent material is made of resin.

8. The manufacturing method according to claim 7, wherein the layer of transparent material is formed by resin injection or by thermoforming a resin sheet.

9. The manufacturing method according to claim 2, wherein the at least partially reflective layer is formed of a plurality of layers of dielectric materials having refractive indices different from each other and forming a dielectric mirror.

10. The manufacturing method according to claim 2, wherein the at least partially reflective reflector is obtained by bringing into relief a metallic film or a plastic film coated on a rear face with an at least partially reflective layer, a front face of the metallic film or the coated plastic film being covered with the layer of transparent material on which the absorbent polariser is fastened, the reflective polarising film formed of the reflector and the absorbent polariser being fastened via said absorbent polariser against the lower face of the rear substrate with the optically transparent adhesive layer.

11. The manufacturing method according to claim 1, wherein the bringing is through the entire front substrate of the liquid crystal cell.

12. A reflective or transflective liquid crystal display device, comprising:

a liquid crystal cell whose liquid crystal molecules are aligned in a planar or vertical manner, said liquid crystal cell being formed of a transparent front substrate located on a side of an observer; and a rear substrate, also transparent, which extends under the front substrate, parallel to and at a distance from the latter, the front and rear substrates being joined together with a sealing frame which delimits a sealed enclosure, wherein a liquid crystal composition is confined, the front and rear substrates are coated on opposite faces thereof with electrically conductive transparent electrodes and counter-electrodes, optical properties of the liquid crystal composition are changed by applying an electric field at a crossing point between an electrode and a corresponding counter-electrode, the liquid crystal display device is provided with a reflective polarising film to absorb a first component of a light which has entered the liquid crystal cell through the front substrate, and to reflect a second component of the light polarised in a direction orthogonal to that of the first component, the light entering the liquid crystal cell before reaching the reflective polarising film, the reflective polarising film comprises an absorbent polariser combined with an at least partially reflective reflector attached directly under the absorbent polariser, the reflector has a decorative and/or functional relief shape including concave and convex shapes visible to an observer through the front substrate of the liquid crystal cell, and the reflective polarising film is fastened against a lower face of the rear substrate of the liquid crystal cell via the absorbent polariser with an optically transparent adhesive layer.

13. The liquid crystal display device according to claim 12, wherein the at least partially reflective layer reflector comprises a layer of transparent material, a rear face of which has a desired decorative and/or functional relief shape and is covered with an at least partially reflective layer, the layer of transparent material also comprising a front face opposite to the rear face on which the absorbent polariser is fastened.

14. The liquid crystal display device according to claim 13, wherein the at least partially reflective layer is metallic.

15. The liquid crystal display device according to claim 14, wherein the metal from which the at least partially reflective layer is made is selected from a group formed by silver, aluminum, nickel, chromium, titanium, platinum, palladium, gold and alloys of these metals.

16. The liquid crystal display device according to claim 13, wherein the at least partially reflective layer is formed of a plurality of layers of dielectric materials having refractive indices different from each other and forming a dielectric mirror.

17. The liquid crystal display device according to claim 13, wherein the at least partially reflective reflector is formed of a metallic film or a plastic film coated on a rear face with the at least partially reflective layer, a front face of the metallic film or the coated plastic film being covered with the layer of transparent material on which the absorbent polariser is fastened.

18. The liquid crystal display device according to claim 13, wherein the layer of transparent material is made of resin.

19. A timepiece comprising the display device according to claim 12.

20. The liquid crystal display device according to claim 12, wherein the decorative and/or functional relief shape is visible to the observer through the entire front substrate of the liquid crystal cell.

\* \* \* \* \*